United States Patent [19]

Roe

[11] Patent Number: 5,121,223
[45] Date of Patent: Jun. 9, 1992

[54] METHOD AND APPARATUS FOR GENERATING A BINARY REPRESENTATION OF AN IMAGE

[75] Inventor: Malcolm D. M. Roe, Hertfordshire, England

[73] Assignee: Crosfield Electronics Ltd., England

[21] Appl. No.: 537,734

[22] Filed: Jun. 14, 1990

[30] Foreign Application Priority Data

Jun. 14, 1989 [GB] United Kingdom ............ 8913680

[51] Int. Cl.$^5$ ............................................ H04N 1/387
[52] U.S. Cl. .................................. 358/455; 358/456; 358/458; 358/465
[58] Field of Search ............ 358/454, 455, 456, 457, 358/458, 461, 463, 465, 466; 382/50

[56] References Cited

U.S. PATENT DOCUMENTS

| | | | |
|---|---|---|---|
| 4,004,079 | 1/1977 | Boston | 358/256 |
| 4,538,184 | 8/1985 | Otsuka et al. | 358/283 |
| 4,578,713 | 3/1986 | Tsao et al. | 358/283 |
| 4,667,250 | 5/1987 | Murai | 358/283 |
| 4,692,811 | 9/1987 | Tsuchiya et al. | 358/282 |
| 4,837,846 | 6/1989 | Oyabu et al. | 382/50 |
| 4,891,714 | 1/1990 | Klees | 358/456 |
| 5,008,950 | 4/1991 | Katayama et al. | 382/50 |

FOREIGN PATENT DOCUMENTS 2011759 6/1979 United Kingdom .

OTHER PUBLICATIONS

Stephen H. Algie, Computer Vision, Graphics. and Image Processing, 24: (1983), "Resolution and Tonal Continuity in Bilevel Printed Picture Quality", pp. 329-346.

B. E. Bayer, Zie Voor Titel Boek, de 2e Pagina (1973), "An Optimum Method for Two-Level Rendition of Continuous-Tone Pictures", pp. 11-15.

*Primary Examiner*—Leo H. Boudreau
*Assistant Examiner*—Andrew W. Johns
*Attorney, Agent, or Firm*—Sughrue, Mion, Zinn, Macpeak & Seas

[57] ABSTRACT

A method for generating a binary representation of an image represented in half-tone form is described in which the image is scanned and sampled, and in which each pixel corresponding to a sample of the image is assigned one of two colors. The method comprises, for each group of abutting and non-overlapping sampled pixels, determining the number of pixels in the group which are to be assigned to each of the two colors (step 13); allocating a unique sequence to the pixels (step 15); and assigning one of the two colors to pixels in sequential order until the predetermined number of pixels of that color has been assigned (step 16) and thereafter assigning the other color to the remaining pixels in the group (step 17).

5 Claims, 4 Drawing Sheets

| 15 | 12 | 7 | 4 |
| 12 | 9  | 5 | 3 |
| 11 | 6  | 3 | 2 |
| 6  | 3  | 2 | 0 |

| 0 | 1  | 4  | 5  |
| 2 | 3  | 6  | 7  |
| 8 | 9  | 12 | 13 |
| 0 | 11 | 14 | 15 |

| W | W | W | B |
| W | W | B | B |
| W | B | B | B |
| W | B | B | B |

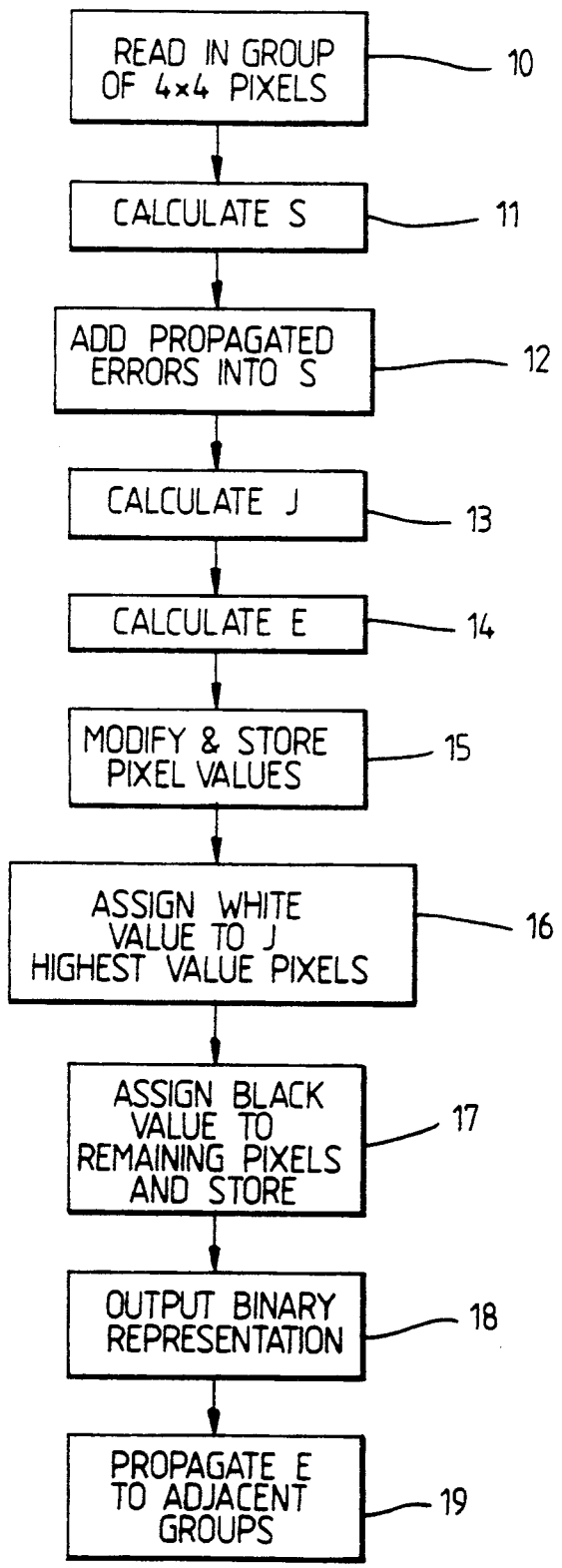

METHOD AND APPARATUS FOR GENERATING A BINARY REPRESENTATION OF AN IMAGE

FIELD OF THE INVENTION

The invention relates to a method and apparatus for generating a binary representation of an image represented in half-tone form, in which the image is scanned and sampled to obtain a colour value representing the colour component content of the sampled pixel, and in which each pixel corresponding to a sample of the image is assigned one of two colours. Such methods and apparatus are hereinafter referred to as of the kind described.

DESCRIPTION OF THE PRIOR ART

Conventional facsimile systems, such as the Crosfield Pagefax system, generate a binary representation of a monochrome image in the above manner by initially scanning an original image which may comprise text and/or half-tone by illuminating the original and determining the intensity of the original at successive scanning positions through an aperture. The use of an aperture with a finite dimension inevitably leads to a degree of blurring at the edges between black and white regions of the image and consequently this initial signal may be converted back into a multi-level digital signal (for example 16 levels). Conventionally, this multi-level signal is then converted into a binary, two-level signal by simply comparing each pixel value with a threshold. For example, all pixels having a multi-level signal greater than the threshold are assigned one of the two colours while the remaining pixels are assigned the other colour. In practice, it has been found that this thresholding technique can lead to the generation of moire patterns particularly where a half-tone image is scanned.

One method for improving upon this has been to increase the sampling frequency but this slows down performance of the system and is generally unsatisfactory. In general, a higher sampling frequency implies either increased time or increased bandwidth (or both). Each of these leads to higher costs.

U.S. Pat. No. 4,538,184 describes a method for solving this problem in which a square window is passed in single pixel steps across the image and at each position the values of pixels within the window are changed in accordance with an algorithm and then the window is moved on by a single pixel pitch and the algorithm reapplied. This leads to a complex computation which is the order of $N^2$ (where the window has a size of $N \times N$ pixels) and does not guarantee that all the grey level values will be removed. In practice, some grey level values will remain and will have to be removed by a subsequent straight forward thresholding step.

GB-A-2011759 and a paper entitled "Resolution and Tonal Continuity in Bilevel Printed Picture Quality", Computer Vision, Graphics and Image Processing, vol. 24 (1983) Dec, pp. 329-346 describe methods of reproducing a continuous tone image on a bi-level printing device. These methods are not appropriate for handling the present problem which is the generation of a bi-level image from a half-tone representation.

SUMMARY OF INVENTION

In accordance with one aspect of the present invention, a method of the kind described comprises, for each group of abutting and non-overlapping sampled pixels, determining the number of pixels in the group which are to be assigned to each of the two colours; allocating a unique sequence to the pixels; and assigning one of the two colours to pixels in sequential order until the predetermined number of pixels of that colour has been assigned and thereafter assigning the other colour to the remaining pixels in the group.

In accordance with a second aspect of the present invention, apparatus of the kind described comprises first means for scanning a window across the image in steps so as to define abutting and non-overlapping groups of sampled pixels; and processing means for determining at each position of the window, the number of pixels in the group which are to be assigned to each of the two colours, for allocating a unique sequence to the pixels within the group, and for assigning one of the two colours to pixels in sequential order until the predetermined number of pixels of that colour has been assigned and thereafter for assigning the other colour to the remaining pixels in the group.

In contrast to the previous attempts to deal with the problems mentioned above, the invention reduces the number of computations significantly to the extent that they are nearly unaffected by the total number of pixels within the group. Instead of choosing a threshold to determine which of the pixels are to be allotted to each colour, a unique sequence is allocated to the pixels so that pixels of the same grey level value can be distinguished.

Various methods may be used to generate the unique sequence. One method would be to number each pixel in the group with a unique number from a sequence. Preferably, however, the allocating step comprises modifying the sampled grey scale value associated with each pixel within the group by adding respective unique values to each grey scale value, wherein each unique value has a magnitude less than the value of one step in the grey scale, the one of the two colours being assigned to pixels in sequential order of modified grey level value until the predetermined number of pixels of that colour has been assigned and assigning the other colour to the remaining pixels in the group thereafter.

The unique values could be random numbers but are preferably dependent on the position of the pixel within the group. In this latter case, it is preferred that pixels with similar unique values are clustered together. For example, the unique values may be related directly to the pixel number (from $0-(N^2-1)$) in the case of a square group of pixels (of size N) in which case the pixel numbers may be assigned by interleaving the bits of the column and row addresses.

The unique values may be added to or subtracted from the grey scale values.

The window defining the group of pixels is preferably square with a size which will be determined empirically. In the case of a square of side N, if N is too small dot break-up occurs with half-tone dot originals. If N becomes comparable in size to the distance between half-tone dots a point is reached at which moire starts to reappear. N should be about the number of pixels required to make a transition from a large area of white to a large area of black. This is determined by the reader spot size or aperture. Avoidance of aliasing leads to a minimum diameter for a gaussian aperture at the 50% point of about the same size as one pixel. If a gaussian of this size is convolved with a step it can be shown that there are about two grey levels between black and white. Thus a minimum choice for N is about 3. To make this a practical choice it would be necessary for the spot size to remain more or less optimum at all sampling pitches. From an optical point of view, the less different sizes the better. This may mean that a choice of N=4 is more appropriate.

The assigning of colours to the pixels may be performed in descending sequence of modified grey levels or ascending sequence, which ever is preferred.

The determination of the number of pixels in each group which are to be assigned to each of the two colours can be performed in any conventional manner using linear or non-linear algorithms. For example, this may be achieved by utilising the algorithm:

$$J = NINT[(S - X.Y.B)/(W - B)] \quad (1)$$

where

J is the number of pixels to be assigned to one of the two colours (eg. white)

S is the sum of the grey level values of all pixels within the group,

W is the value to be assigned to pixels of the one colour

B is the value to be assigned to pixels of the other colour

X and Y are the dimensions of the group, and NINT means the nearest integer.

Typically, one of W and B will be zero (in this case B) and the group will be square with a dimension N. In this case the algorithm reduces to $$J = NINT(S/W) \quad (2)$$

It will be seen that this is independent of the size of the group other than the fact that S is dependent on the number of pixels within the group. Thus, if there are $N^2$ elements (pixels) in the window, the calculation complexity to produce J is $\alpha N^2$. For U.S. Pat. No. 4,538,184 this is required to produce one output pixel implying an order ($N^2$) algorithm. In the present case $N^2$ output pixels would be produced so the complexity $\alpha N^2/N^2$. That is, it is independent of N. Strictly, this is only true of the summation process and calculation of J. Allowance also has to be made for the allocation process—i.e. sorting the J out of $N^2$ pixels. The complexity of this is of order (log N). However, log $N < < N^2$ for anything other than very small N so it can be ignored with safety.

In many cases, the value of J will differ by a fractional amount from the exact value of S/W. This error can be propagated to adjacent pixels in a conventional manner. For example, if the total error is E then E/2 could be assigned to the adjacent row pixel and the adjacent column pixel respectively.

Preferably, the pixels with grey level values close to the transition point are allocated positions in the unique sequence so that the pixels define spatially adjacent groups to the one colour.

As mentioned above, the original grey scale values can be generated by a facsimile system but other forms of generation are also possible.

BRIEF DESCRIPTION OF THE DRAWINGS

An example of a method and apparatus according to the present invention will now be described with reference to the accompanying drawings, in which:

FIG. 5 is a flow diagram illustrating operation of the apparatus shown in FIG. 4.

DETAILED DESCRIPTION OF AN EMBODIMENT

Figures 1, 2, 3, 4:
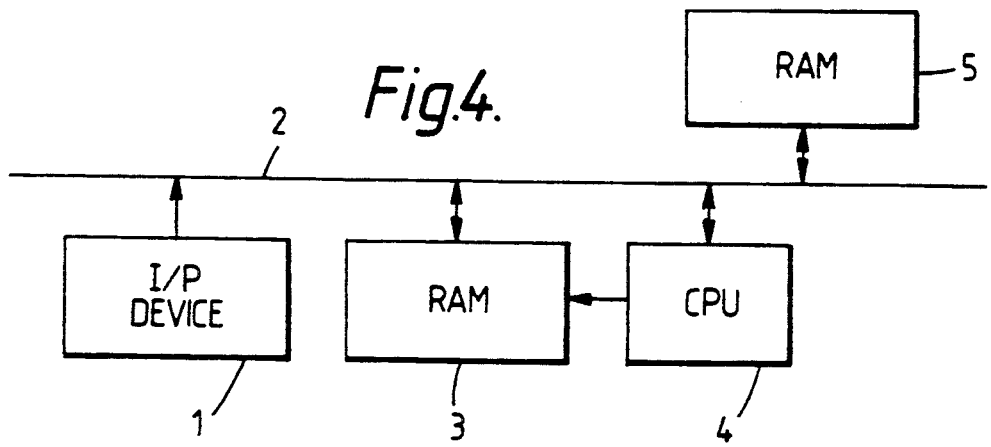
FIG. 1 illustrates the grey level values of an array of pixels.
FIG. 2 illustrates the allocation of pixel numbers to the array.
FIG. 3 illustrates the assignment of white and black values to the array of FIG. 1.
FIG. 4 illustrates an example of apparatus for carrying out the method.

FIG. 1 illustrates a square array of 4×4 pixels (N=4) which overlaps an edge between a white region towards the top left hand corner of the group and a black region towards the bottom right hand corner. Each pixel corresponds to a sample from a half-tone image and is defined by a four bit binary value representing a sixteen level grey scale, the decimal equivalents of the binary values being shown in FIG. 1. The invention enables this grey scale array to be changed into a binary, two level array as shown in FIG. 3 of which each pixel is allotted either a white value or a black value. In this case, White is taken to be decimal 15 and Black to be zero.

FIG. 4 illustrates apparatus for performing the method in which an input device 1, such as a facsimile machine, is connected to a data bus 2. A random access memory (RAM) 3 having dimensions 4×4 is also coupled to the data bus 2 and to a microprocessor 4. An output RAM 5 connected to the data bus 2 is connected for storing the digitised group.

In a step 10 (FIG. 5) the microprocessor 4 effectively moves a window over a 4×4 array of pixels and loads the appropriate values into the RAM 3. In this case, we will consider the loading of the values shown in FIG. 1 into the RAM 3. The sum of the grey level values in the array in the RAM 3 (S) is then calculated in a step 11 and in this case S=100.

Previously generated error values E from preceding arrays are added to S (step 12).

The microprocessor 4 then calculates the number of pixels J which are to be assigned to White using equation 2 above. Thus, (if E=0):

$$J = NINT(100/15) = 7. \text{ (step 13)}$$

A new error value E is calculated (step 14). This is in general defined as $$E = S - f^{-1}(J)$$

where $J = NINT\ (f(S))$.

In the present case:

$$\begin{aligned} E &= S - J \times W \\ &= 100 - 105 \\ &= -5 \end{aligned}$$

The microprocessor 4 also adjusts the values shown in FIG. 1 in accordance with the corresponding pixel number (step 15). The pixel numbers are shown in FIG.

2 and each is divided by 16 to define a fraction between zero and 15/16 which is then added to the values shown in FIG. 1.

The microprocessor 4 then assigns the White pixels (step 16). This is achieved by assigning White (W) to the pixels having the highest modified grey level values in descending order. As can be seen in FIG. 1, the first six White pixels can be allotted unambiguously to the cluster in the top left hand corner of the group. However, one further white pixel has to be allotted and in FIG. 1 this could be to either of the pixels with a grey level of six. To resolve this ambiguity, the pixel values have been modified in accordance with the pixel number so that the pixel in the lower left-hand corner of FIG. 1 now has a grey level value 6 10/16 while the one diagonally above it has a value of 6 9/16. This means that the lower left-hand pixel has the higher value and is allotted white.

The microprocessor next allots Black to the remaining pixels and the appropriate values are stored in the RAM 5 (steps 17 and 18).

The error value E (−5) is then divided and propagated on to adjacent unprocessed groups of pixels (step 19) in a manner similar to conventional error diffusion.

Figure 6A:
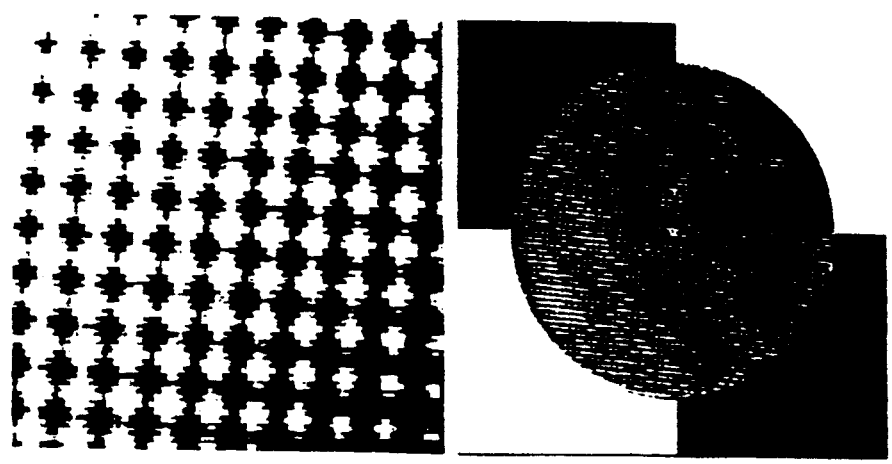
FIG. 6A shows an example of an image at high and low magnification.

To illustrate the effect of the invention, an original eight bit grey level image was generated which is shown at high and low magnification in FIG. 6A.

Figure 6B:
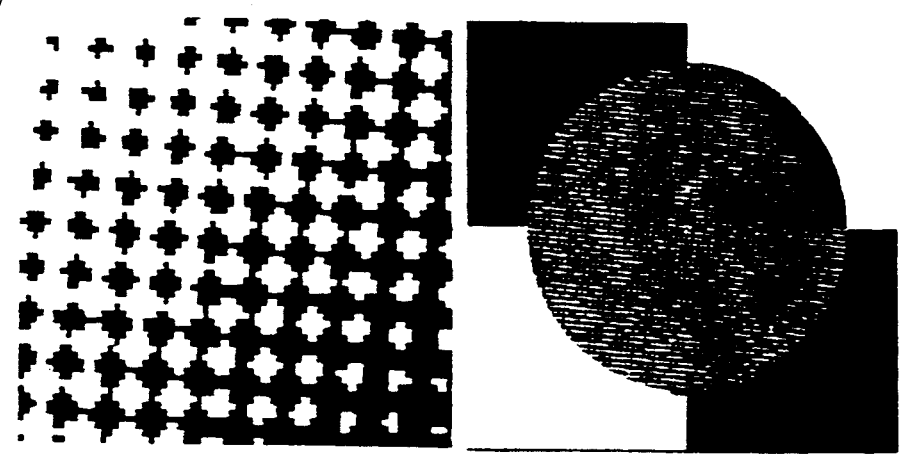
FIGS. 6B and 6C show the FIG. 6A image following conventional thresholding.
Figure 6C:
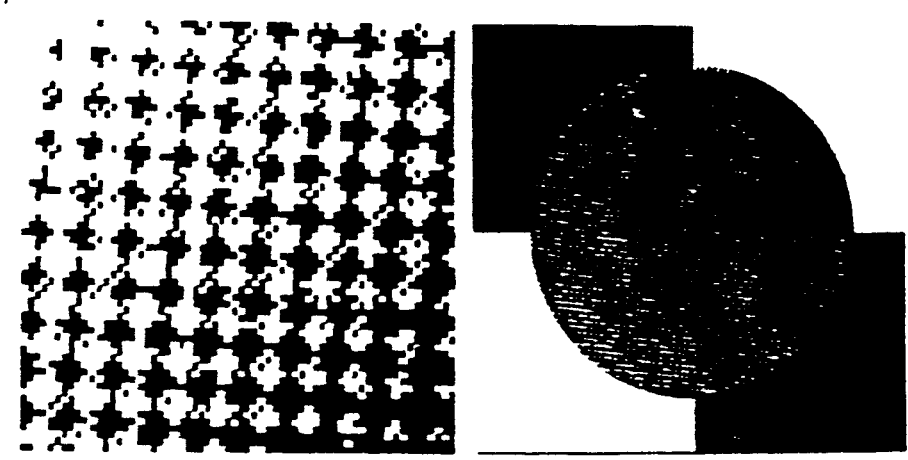

FIG. 6B illustrates the application of a simple conventional thresholding technique with the threshold set at a fifty percent value. It can be seen from the low magnification version that significant moire results. FIG. 6C illustrates a combination of simple thresholding and error diffusion which removes moire but at the cost of serious dot break-up which would be unprintable.

Figure 7A:
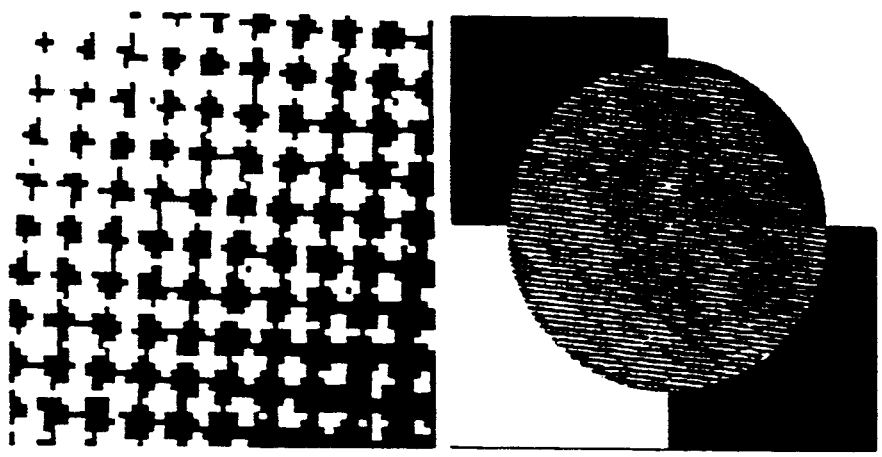
FIGS. 7A-7C show the FIG. 6A image after processing in accordance with the invention.

FIG. 7A illustrates the result of applying a technique according to the invention in which the window size has been set at 2×2. It can be seen from the low magnification that there is a significantly reduced dot break-up over the results shown in FIG. 6C together with an absence of moire.

Figure 7B:
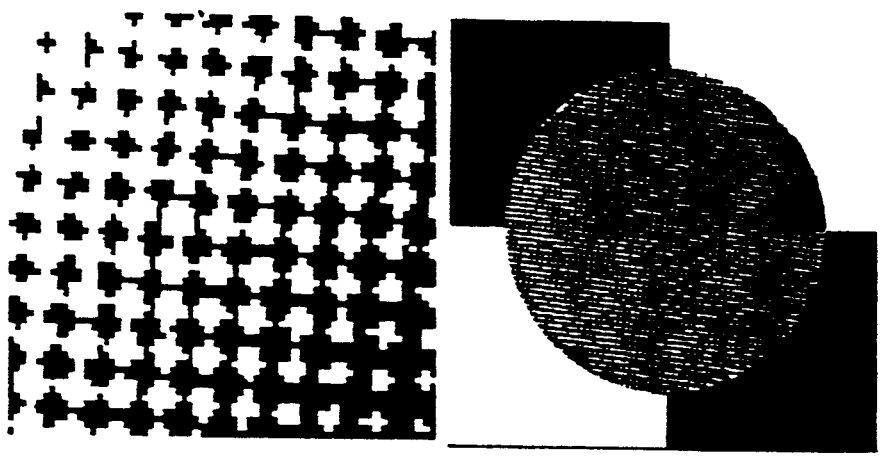

FIG. 7B is similar to FIG. 7A but in this case the window has been set at 3×3 and it will be seen that this virtually eliminates dot break-up.

Figure 7C:
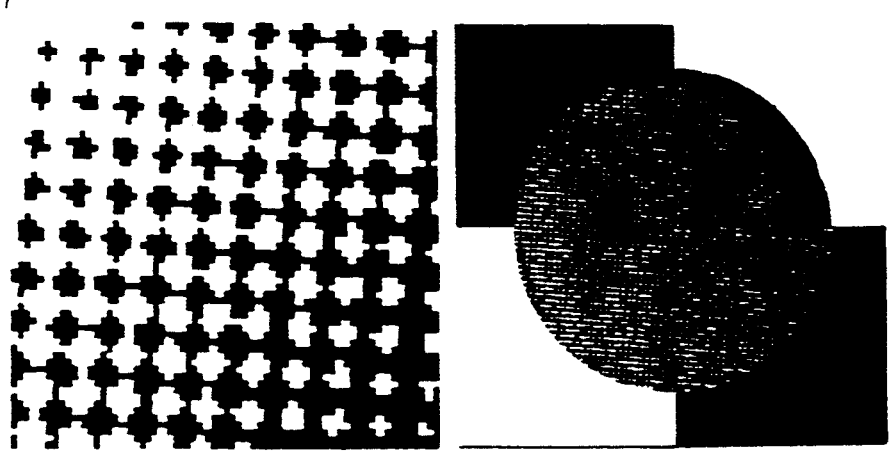

FIG. 7C illustrates the application of a window having dimensions 4×4. Again, there is no dot break-up.

I claim:

1. A method for generating a binary representation of an image represented in half-tone form, in which said image is scanned and sampled to obtain a colour value representing the colour component content of each sampled pixel, and in which each pixel corresponding to a sample of said image is assigned one of two colours, the method comprising the steps of:
    selecting groups of abutting and non-overlapping pixels;
    for each of said groups of abutting and non-overlapping pixels, determining the number of pixels in said each of said groups which are to be assigned to each of said two colours;
    allocating a unique sequence to said pixels; and
    assigning one of said two colours to pixels in sequential order until a predetermined number of pixels of that colour has been assigned and thereafter assigning said other colour to the remaining pixels in said each of said groups,
    wherein each sampled pixel has a colour content represented by a grey scale value, and
    wherein said allocating step comprises modifying the sampled grey scale value associated with each of said pixels within said each of said groups by adding respective unique values to each grey scale value, wherein each unique value has a magnitude less than said value of one step in said grey scale, said one of said two colours being assigned to pixels in sequential order of modified grey scale value until said predetermined number of pixels of that colour has been assigned and assigning said other colour to the remaining pixels in said each of said groups thereafter.

2. A method according to claim 1, in which said unique values are dependent on the position of the pixel within said each of said groups.

3. A method according to claim 1, further comprising the step of determining the difference between the colours allotted to a group of pixels and the corresponding sampled pixel colour values, and distributing the difference to adjacent, unprocessed groups of pixels.

4. A method according to claim 3, wherein the difference (E) is defined by $$E = S - f^1(J)$$

where
    $J = NINT\ (f(S))$, J being the number of pixels to be assigned to one of the two colours, and
    S is the sum of the grey level values of all pixels within said each of said groups.

5. Apparatus for generating a binary representation of an image represented in half-tone form, in which the image is scanned and sampled to obtain a colour value representing the colour component content of each sampled pixel, and in which each pixel corresponding to a sample of the image is assigned one of two colours, the apparatus comprising: first means (4) for scanning a window across said image in steps so as to define abutting and non-overlapping groups of sampled pixels; and processing means (4) for determining at each position of said window the number of pixels in each of said groups which are to be assigned to each of said two colours, for allocating a unique sequence to said pixels within said each of said groups, and for assigning one of said two colours to pixels in sequential order until the predetermined number of pixels of that colour has been assigned and thereafter for assigning the other colour to the remaining pixels in said each of said groups, wherein each sampled pixel has a colour content represented by a grey scale value, and wherein said processing means comprises means for modifying the sampled grey scale value associated with each of said pixels within said each of said groups by adding respective unique values to each grey scale value, wherein each unique value has a magnitude less than said value of one step in said grey scale, said one of said two colours being assigned to pixels in sequential order of modified grey scale value until said predetermined number of pixels of that colour has been assigned and said other colour being assigned tot he remaining pixels in said each of said groups thereafter.

* * * * *